United States Patent
Chen et al.

(10) Patent No.: US 11,641,512 B2
(45) Date of Patent: May 2, 2023

(54) VIDEO RECORDING METHOD, APPARATUS, ELECTRONIC DEVICE AND NON-TRANSITORY STORAGE MEDIUM

(71) Applicant: BEIJING BYTEDANCE NETWORK TECHNOLOGY CO., LTD., Beijing (CN)

(72) Inventors: Zheni Chen, Beijing (CN); Yujun Song, Beijing (CN)

(73) Assignee: BEIJLNG BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/804,249

(22) Filed: May 26, 2022

(65) Prior Publication Data
US 2022/0286758 A1    Sep. 8, 2022

Related U.S. Application Data

(63) Continuation-in-part of application No. PCT/CN2021/105019, filed on Jul. 7, 2021.

(51) Int. Cl.
G06F 9/451    (2018.01)
H04N 21/81    (2011.01)

(52) U.S. Cl.
CPC ......... *H04N 21/8106* (2013.01); *G06F 9/453* (2018.02)

(58) Field of Classification Search
CPC ........................................................ G06F 3/14
See application file for complete search history.

(56) References Cited

U.S. PATENT DOCUMENTS

| 2007/0021200 | A1  | 1/2007 | Fox et al. | |
| 2010/0031149 | A1* | 2/2010 | Gentile | H04N 5/272 348/135 |
| 2014/0036023 | A1* | 2/2014 | Croen | H04N 7/147 348/14.01 |
| 2014/0189734 | A1  | 7/2014 | Anguiano | |

(Continued)

FOREIGN PATENT DOCUMENTS

| CN | 101202863 A | 6/2008 |
| CN | 103179437 A | 6/2013 |

(Continued)

OTHER PUBLICATIONS

First Examination Report dated Feb. 15, 2023 in Australian Patent Application No. 2021308027 (3 pages).

*Primary Examiner* — Di Xiao (57) ABSTRACT

Disclosed in the embodiments of the present disclosure are a video recording method and apparatus, an electronic device, and a storage medium. The method includes: upon receiving an instruction to be recorded, prompting a recording subject that is matched with said instruction, so as to inform a user of the subject information of a video to be recorded; and upon receiving a recording starting instruction, separately performing video recording on the user and a virtual teacher according to a recording order matched with the recording subject, wherein when video recording is performed on the user, response information is determined according to the voice content of the user in the video, and the voice of the virtual teacher expressing the response information is played in a video background voice mode.

17 Claims, 2 Drawing Sheets

(56) References Cited

U.S. PATENT DOCUMENTS

| | | | | |
|---|---|---|---|---|
| 2016/0133154 A1* | 5/2016 | Cortes | ................ | G09B 5/00 |
| | | | | 434/157 |
| 2018/0205797 A1* | 7/2018 | Faulkner | ................ | H04L 67/14 |
| 2019/0196609 A1* | 6/2019 | Aube | ................ | G06F 1/1686 |
| 2020/0312183 A1* | 10/2020 | Theobald | ................ | G09B 7/06 |
| 2022/0239721 A1* | 7/2022 | Masuda | ................ | H04N 7/04 |

FOREIGN PATENT DOCUMENTS

| | | |
|---|---|---|
| CN | 104537925 A | 4/2015 |
| CN | 108090491 A | 5/2018 |
| CN | 109429075 A | 3/2019 |
| CN | 110557565 A | 12/2019 |
| CN | 111372119 A | 7/2020 |
| CN | 111787259 A | 10/2020 |

* cited by examiner

VIDEO RECORDING METHOD, APPARATUS, ELECTRONIC DEVICE AND NON-TRANSITORY STORAGE MEDIUM

CROSS-REFERENCE TO RELATED APPLICATIONS

This application is a continuation-in-part of International Patent Application No. PCT/CN2021/105019, filed on Jul. 7, 2021, which claims the priority of Chinese Application for application No. 202010694675.6, filed to the Patent Office of the People's Republic of China on Jul. 17, 2020, entitled "VIDEO RECORDING METHOD, APPARATUS, ELECTRONIC DEVICE AND STORAGE MEDIUM", the entire content of both of which are incorporated herein by reference.

TECHNICAL FIELD

This disclosure relates to the technical field of computers, in particular to a video recording method, apparatus, electronic device and non-transitory storage medium.

BACKGROUND

With the continuous improvement of functions of smart terminals, the number of applications applied to smart terminals is also increasing. Taking video recording, sharing and viewing applications as an example, users can record featured videos, and then share the featured videos recorded by themselves on an application platform, so that other users on the application platform can view the featured videos, so as to increase entertainment interest or increase enthusiasm for learning.

At present, when recording a video for a user who is learning, for example, in an oral dialogue process with a virtual teacher, the user's video and the virtual teacher' video are generally displayed, played, and recorded on the same page.

SUMMARY

Embodiments of the present disclosure provide a video recording method, apparatus, electronic device, and storage medium, which can improve the video recording efficiency and effect.

In a first aspect, an embodiment of the present disclosure provides a video recording method, comprising:

when receiving a recording preparation instruction, prompting a recording subject matching the recording preparation instruction to inform a user of subject information of a to-be-recorded video;

when receiving a recording start instruction, recording videos for the user and a virtual teacher separately according to a recording sequence matching the recording subject;

determining response information based on a voice content of the user in a video recorded for the user, and playing a voice of the virtual teacher expressing the response information as a video background voice, when recording the video recorded for the user.

In a second aspect, an embodiment of the present disclosure further provides a video recording apparatus, comprising:

a prompting module for when receiving a recording preparation instruction, prompting a recording subject matching the recording preparation instruction to inform a user of subject information of a to-be-recorded video;

a recording module for when receiving a recording start instruction, recording videos for the user and a virtual teacher separately according to a recording sequence matching the recording subject, wherein, when recording a video recorded for the user, response information is determined based on a voice content of the user in the video recorded for the user, and a voice of the virtual teacher expressing the response information is played as a video background voice.

In a third aspect, an embodiment of the present disclosure further provides a device, comprising:

one or more processors;

a memory for storing one or more programs, which when executed by the one or more processors cause the one or more processors to implement the video recording method according to any one of the embodiments of the present disclosure.

In a fourth aspect, an embodiment of the present disclosure further provides a storage medium containing computer executable instructions that, when executed by a computer processor, execute the video recording method according to any one of the embodiments of the present disclosure.

In a fifth aspect, an embodiment of the present disclosure further provides a computer program product, comprising: a computer program that, when executed by a processing device, executes the steps of the method described in the first aspect of the present disclosure.

In a sixth aspect, an embodiment of the present disclosure further provides a computer program that, when executed by a processing device, executes the steps of the method described in the first aspect of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

When recording a video for a user who is learning, for example, in an oral dialogue process with a virtual teacher, the user's video and the virtual teacher' video are generally displayed, played, and recorded on the same page. In this recording manner, the user's attention is easily distracted by the screen of the virtual teacher, resulting in the user's inattention, which in turn leads to poor learning effect and unsatisfied video recording effect. Often, users need to record repeatedly to get a satisfied video.

Embodiment 1

Figure 1:
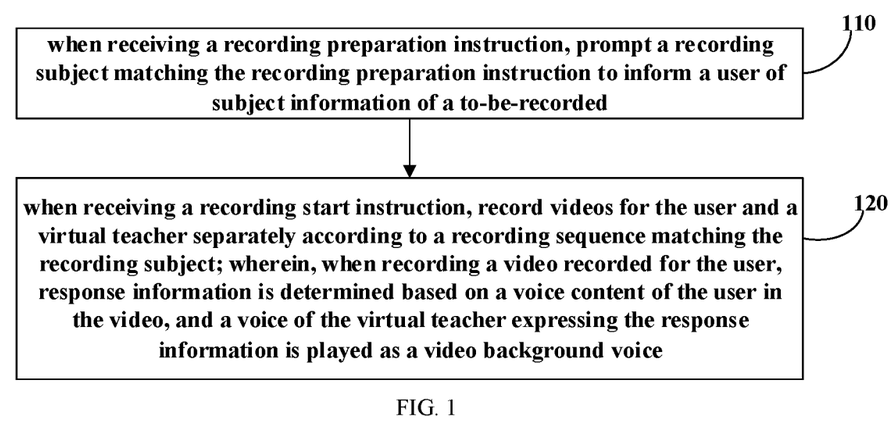
FIG. 1 is a schematic flowchart of a video recording method according to Embodiment 1 of the present disclosure.

FIG. 1 is a schematic flowchart of a video recording method provided in Embodiment 1 of the present disclosure. The method is applicable to video recording scenarios, typically, for example, to a scenario that a user who is learning something wants to record a video about his learning, more specifically, for example, to a scenario of English speaking practice, in which a user has oral conversations with a virtual teacher to improve their speaking ability. The video recording method provided in this embodiment can be used in this scenario to record oral conversations between the user and the virtual teacher. The method may be performed by a video recording apparatus, which may be implemented in the form of software and/or hardware.

As shown in FIG. 1, the video recording method provided in this embodiment comprises the following steps:

Step 110: when receiving a recording preparation instruction, prompting a recording subject matching the recording preparation instruction to inform a user of subject information of a to-be-recorded video.

Wherein, the to-be-recorded video may be a learning video of the user, or a video of the user imitating a certain film or television plot. The recording subject specifically refers to information contained in the video, especially information that needs to be expressed by the user, such as a way of making a sentence containing a certain idiom, or reply information for a question in an oral practice. The user needs to say the way of making a sentence containing the certain idiom or reply information for the question when recording the video; for example, the lines of a character in a certain film and television plot, and the like.

Taking a scenario of speaking practice as an example, the usual dialogue mode is that the user asks a question and the virtual teacher answers, or the virtual teacher asks a question and the user answers. The recording preparation instruction may be an instruction triggered when the user enters a certain roles-card page. For example, the user enters, through a specific application, a roles-card page, which is also an entry page for recording a video of a specific plot, and usually displays subject information of the specific plot on the page. For example, the specific plot is to introduce one's family members in English, and the corresponding subject information is a template of the expression of introducing one's family members in English that the user needs to memorize before recording. For another example, the specific plot is an ordering process at a restaurant in English, and the corresponding subject information is the English expression of the ordering process at the restaurant. The user needs to memorize the English expression before recording the video. When recording the video, the user can take the role of a guest, the virtual teacher can take the role of a restaurant waiter, and the user and the virtual teacher have oral conversations, thereby improving the user's oral expression ability.

Exemplarily, prompting a recording subject matching the recording preparation instruction comprises:

displaying the recording subject matching the recording preparation instruction;

or playing a voice stating the recording subject matching the recording preparation instruction;

Step 120: when receiving a recording start instruction, recording videos for the user and a virtual teacher separately according to a recording sequence matching the recording subject; determining response information based on a voice content of the user in a video recorded for the user, and playing a voice of the virtual teacher expressing the response information as a video background voice, when recording the video recorded for the user.

Specifically, the user can trigger the recording start instruction through a "Record" button on the roles-card page described above. Different recording subjects matches different recording sequences. Some recording subjects require the user to speak first, while some recording subjects require the virtual teacher to speak first. It can be understood that the role of the user is usually a leading role in the plot by default, and the virtual teacher is a supporting role in the plot to motivate the enthusiasm of the user. In the learning scenario, by increasing the number and content of the user's speech, the purpose of improving the user's learning efficiency can be achieved. Of course, the user can also change the role played by the user to play a supporting role, in which case the virtual teacher will play the leading role. If the user changes the role played, the recording sequence changes accordingly.

If the recording sequence is that the user speaks first, then the virtual teacher responds, and then the user speaks again . . . , and if the user's video is marked as type B, and the virtual teacher's video is marked as type A, the above recording sequence is BABABA. If the recording sequence is that the virtual teacher speaks first, and then the user responds, the recording sequence is ABABAB. That is, video recording is performed for the user and the virtual teacher separately, rather than simultaneously recording the user and the virtual teacher. At each point of time in the video recording, only one recording object is displayed on the video recording page, rather than displaying two or more recording objects at the same time, so that one recording object cannot be affected by other recording objects to mainly prevent the user from being affected by other virtual characters, so as to reduce the probability of the user's poor performance during the video recording process, and improve the efficiency and effect of the user's video recording.

Exemplarily, recording videos for the user and a virtual teacher separately according to a recording sequence matching the recording subject comprises:

determining a first time recorded object and a non-first time recorded object based on the recording sequence, wherein the first time recorded object comprises the user or the virtual teacher, and the non-first time recorded object comprises the virtual teacher or the user;

recording a video of the first time recorded object;

when the video of the first time recorded object recording reaches a switching node, suspending recording the video of the first time recorded object;

recoding a video of the non-first time recorded object, during which the non-first time recorded object responds based on a behavior of the first time recorded object during a video recording process of the first time recorded object, so as to assist the first time recorded object to adjust the expression content, and thereby, in the oral dialogue practice, the oral dialogue ability of the user (assuming the user is the first time recorded object) can be improved;

wherein, during a video recording process, the first time recorded object or the non-first time recorded object is displayed in a full-screen display mode, so as to improve the user's sense of immersion when recording the video.

The switching node is usually the end of a plot. For example, when the user finishes ordering a meal, he needs to wait for a period of time before entering the serving stage. Therefore, it can be considered that a switching node occurs when the user finishes ordering, and the camera is switched to another recording object, such as the virtual teacher. The virtual teacher's video is usually a video that advances the storyline, assisting the user to enter a next action naturally, creating a mental expectation for the recording content of the next segment, thereby improving the user's recording experience, recording efficiency and effect. The virtual teacher can also be the first time recorded object, that is, the virtual teacher is given priority to video recording, and guides the user to transition to the storyline and enter the recording state. In this case, the role of the virtual teacher is equivalent to that of a host, responsible for running through, advancing and guiding the entire storyline. Therefore, the switching node can be identified and determined based on the recorded video content. Specifically, when the first time recorded object is the user, recoding a video of the first time recorded object comprises:

recording a video of the user;

determining response information based on the user's voice content in the video;

playing a voice of the virtual teacher expressing the response information in the form of a video background voice, and displaying text of the response information and/or a picture associated with the response information on the video recording page.

For example, in a learning scenario, the user learns spoken English to introduce his family members, and the virtual teacher guides the user into the recording state. During a video recording process of the user, when the user expresses "this is our mother" in spoken English, the response information is determined to be "Who is this?" based on the user's voice content and in conjunction with preset plot progress information, and a picture associated with the response information, such as a picture of the users' grandpa, is displayed in a floating window on the recording page of the user video, and the virtual teacher's voices "Who is this?" in Chinese and English are played as background voice.

Exemplarily, determining response information based on the voice content of the user in the video comprises:

determining a degree of matching between the voice content of the user in the video and a preset content;

if the degree of matching reaches a threshold, determining that the response information is first-type information (for example, "you are great"), so as to praise the user's behavior through the first-type information; otherwise determining that the response information is second-type information (for example, "not too bad, do it again, come on"), so as to encourage the user's behavior through the second-type information.

In the learning scenario, by determining the degree of matching between the user's voice content in the video and a preset content, which is usually a correct answer, the user's mastery of the learned knowledge can be predicted, By responding to the user's performance accordingly, the user's enthusiasm for learning can be stimulated, thereby improving the user's learning efficiency. In oral practice, dialogues are usually practiced many times with the user in non-standard spoken language, which can improve the user's oral expression ability.

In the technical solution of the embodiments of the present disclosure, by means of the technique means of when receiving a recording preparation instruction, prompting a recording subject matching the recording preparation instruction to inform a user of subject information of a to-be-recorded video; when receiving a recording start instruction, recording videos for the user and a virtual teacher separately according to a recording sequence matching the recording subject, the problem of simultaneous recording of the user and the virtual teacher on the same recording page can be avoided, thereby reducing the risk of distraction of the user's attention, improving the success rate of video recording, and achieving the purpose of improving the efficiency and effect of video recording.

In the technical solution of the embodiments of the present disclosure, by means of the technique means of when receiving a recording preparation instruction, prompting a recording subject matching the recording preparation instruction to inform a user of subject information of a to-be-recorded video; when receiving a recording start instruction, recording videos for the user and a virtual teacher separately according to a recording sequence matching the recording subject, wherein when recording a video recorded for the user, response information is determined based on a voice content of the user in the video, and a voice of the virtual teacher expressing the response information is played as a video background voice, the problem of recording of the user and the virtual teacher on the same recording page can be avoided, thereby reducing the risk of distraction of the user's attention, improving the success rate of video recording, and achieving the purpose of improving the efficiency and effect of video recording.

Embodiment 2

Figure 2:
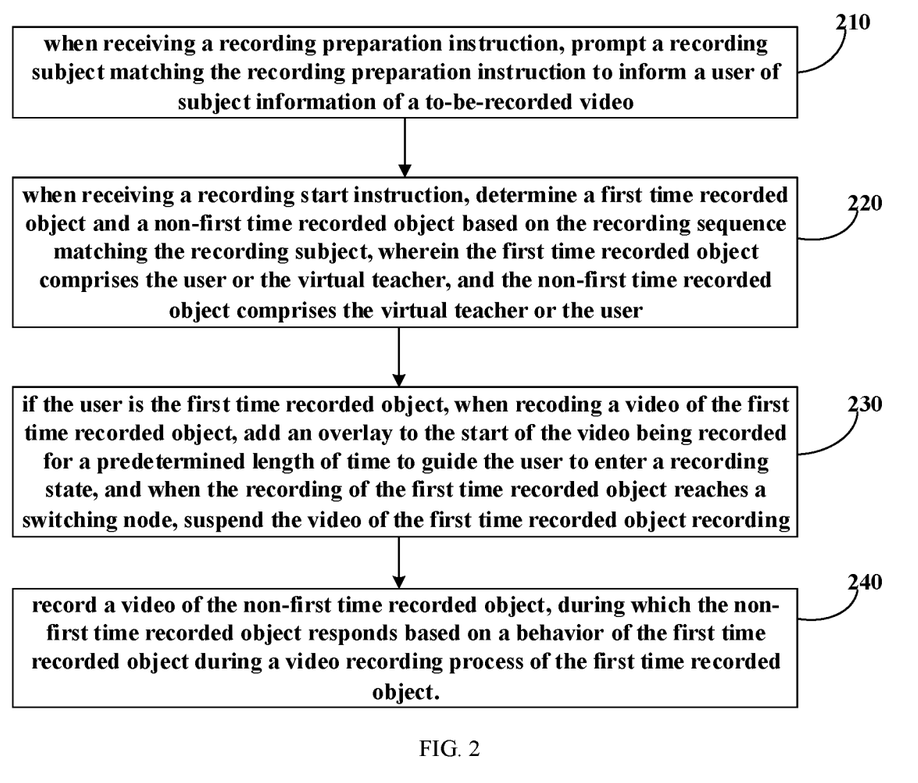
FIG. 2 is a schematic flowchart of a video recording method according to Embodiment 2 of the present disclosure.

FIG. 2 is a schematic flowchart of a video recording method according to Embodiment 2 of the present disclosure. On the basis of the above embodiment, this embodiment further optimizes the solution, specifically, when the user is the first time recorded object, the step "recording a video of the first time recorded object" is optimized, so as to improve the user's recording experience.

As shown in FIG. 2, the method comprises:

Step 210: when receiving a recording preparation instruction, prompting a recording subject matching the recording preparation instruction to inform a user of subject information of a to-be-recorded video.

Step 220: when receiving a recording start instruction, determining a first time recorded object and a non-first time recorded object based on the recording sequence matching the recording subject, wherein the first time recorded object comprises the user or the virtual teacher, and the non-first time recorded object comprises the virtual teacher or the user.

Step 230: if the user is the first time recorded object, when recoding a video of the first time recorded object, adding an overlay to the video started being recorded for a predetermined length of time to guide the user to enter a recording state, and when the recording of the first time recorded object reaches a switching node, suspending recording the video of the first time recorded object.

Step 240: recoding a video of the non-first time recorded object, during which the non-first time recorded object responds based on a behavior of the first time recorded object during a video recording process of the first time recorded object.

The first recording subject then responds to the behavior of the non-first recording subject in a video recording process and so on, until the end of the plot. If the video of the first time recorded object is marked as A, and the video of the non-first time recorded object is marked as B, video A is recorded first, and then video B, video A, and again video B. That is, the first time recorded object and the non-first time recorded object are recorded separately in the order of ABABAB, so as to prevent the influence of the first time recorded object A on the non-first time recorded object B and vice versa.

Further, the method further comprises:

stitching the video recorded for the user and a video recorded for the virtual teacher based on a recording timing relationship;

playing a stitched video in a full screen mode;

wherein, the video recorded for the user comprises a background voice issued by the virtual teacher and associated pictures, the background voice comprising the virtual teacher's response information to the information expressed by the user during a video recording process. By stitching the user's video and the virtual teacher's video, and adding the virtual teacher's background voice and related pictures to the user's video, the purpose of generating a complete video with better effect is achieved, which can be enjoyed or shared by the user.

According to the technical solution of the embodiment of the present disclosure, when recoding a video of the user, a blur effect is imposed at the start of recording for a preset length of time, so as to guide the user to enter a recording state naturally, and prevent a feeling of abruptness when the user suddenly views his own portrait. At the same time, in the process of video recording for the user, the voice of the conversations between the virtual teacher and the user is added as a background voice, and if necessary, associated pictures are displayed on the user's video recording page to assist the user to respond to the content of the virtual teacher's speech, thereby avoiding the virtual teacher from distracting the user, thereby improving the user's learning efficiency, and improving the efficiency and effect of video recording.

Embodiment 3

Figure 3:
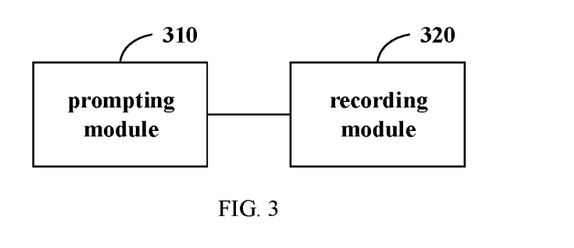
FIG. 3 is a schematic structural diagram of a video recording apparatus according to Embodiment 3 of the present disclosure.

FIG. 3 shows a video recording apparatus provided in Embodiment 3 of the present disclosure, which comprises: a prompting module 310 and a recording module 320.

Wherein, the prompting module 310 is used for when receiving a recording preparation instruction, prompting a recording subject matching the recording preparation instruction to inform a user of subject information of a to-be-recorded video; the recording module 320 is for when receiving a recording start instruction, recording videos for the user and a virtual teacher separately according to a recording sequence matching the recording subject; determining response information based on a voice content of the user in a video recorded for the user, and playing a voice of the virtual teacher expressing the response information as a video background voice, when recording the video recorded for the user.

On the basis of the above technical solution, the prompting module 310 is specifically used for:

displaying the recording subject matching the recording preparation instruction;

or playing a voice stating the recording subject matching the recording preparation instruction.

On the basis of the various technical solutions described above, the recording module 320 comprises:

a determining unit for determining a first time recorded object and a non-first time recorded object based on the recording sequence, wherein the first time recorded object comprises the user or the virtual teacher, and the non-first time recorded object comprises the virtual teacher or the user;

a first recording unit for recording a video of the first time recorded object;

a suspending unit for when the video of the first time recorded object recording reaches a switching node, suspending recording the video of the first time recorded object;

a second recording unit for recoding a video of the non-first time recorded object, during which the non-first time recorded object responds based on a behavior of the first time recorded object during a video recording process of the first time recorded object;

wherein, during a video recording process, the first time recorded object or the non-first time recorded object is displayed in a full-screen display mode.

On the basis of the various technical solutions described above, the first recording unit comprises:

an overlay processing subunit for adding an overlay to the start of a video being recorded for a predetermined length of time to guide the user to enter a recording state;

a recording subunit for recording a video of the user;

a determining subunit for determining response information based on the user's voice content in the video;

a playback subunit for playing a voice of the virtual teacher expressing the response information in the form of a video background voice, and displaying text of the response information and/or a picture associated with the response information on a video recording page.

On the basis of the various technical solutions described above, the determining subunit is specifically used for: determining a degree of matching between the voice content of the user in the video and a preset content;

if the degree of matching reaches a threshold, determining that the response information is first-type information, so as to praise the user's behavior through the first-type information; otherwise determining that the response information is second-type information, so as to encourage the user's behavior through the second-type information.

On the basis of the various technical solutions described above, the apparatus further comprises:

a stitching module for stitching the video recorded for the user and a video recorded for the virtual teacher based on a recording timing relationship;

a playback module for playing a stitched video in a full screen mode;

wherein, the video recorded for the user comprises a background voice issued by the virtual teacher, the background voice comprising the virtual teacher's response information to the information expressed by the user during a video recording process.

In the technical solution of the embodiments of the present disclosure, by means of the technique means of when receiving a recording preparation instruction, prompting a recording subject matching the recording preparation instruction to inform a user of subject information of a to-be-recorded video; when receiving a recording start instruction, recording videos for the user and a virtual teacher separately according to a recording sequence matching the recording subject, the problem of simultaneous recording of the user and the virtual teacher on the same recording page can be avoided, thereby reducing the risk of distraction of the user's attention, improving the success rate of video recording, and achieving the purpose of improving the efficiency and effect of video recording.

The video recording apparatus provided in this embodiment of the present disclosure can execute the video recording method provided in any embodiment of the present disclosure, and has corresponding functional modules to implement the method and achieve the beneficial effect of the present disclosure.

It should be noted that the units and modules comprised in the above apparatus are only divided according to the functional logic, but are not limited to the above division, as long as the corresponding functions can be realized; In addition, the specific names of the functional units are only for the convenience of distinguishing from each other, and are not used to limit the protection scope of the embodiments of the present disclosure.

Embodiment 4

Figure 4:
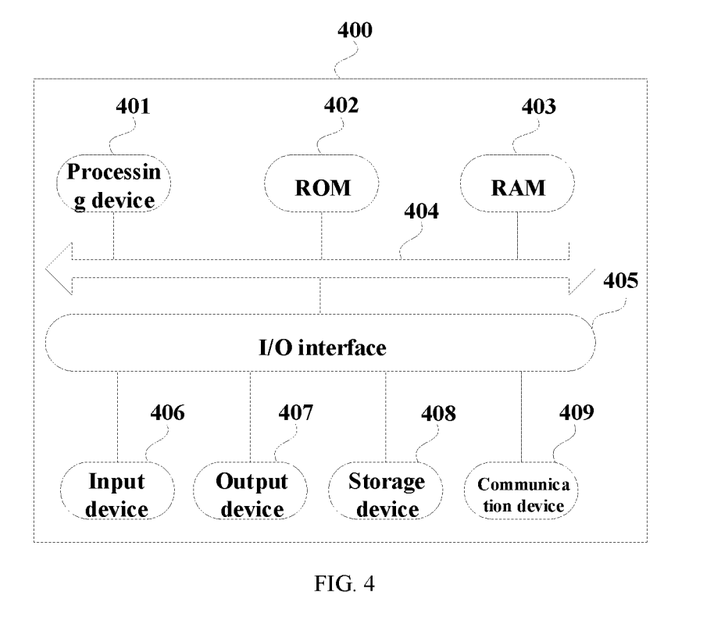
FIG. 4 is a schematic structural diagram of an electronic device according to Embodiment 4 of the present disclosure.

Referring now to FIG. 4, a structural diagram of an electronic device (e.g., a terminal device or server shown in FIG. 4) 400 suitable for implementing the embodiments of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 4 is merely an example and should not impose any limitation on the function and scope of the embodiment of the present disclosure.

As shown in FIG. 4, the electronic device 400 may comprise a processing device (e.g., a central processing unit, a graphics processor) 401, which may perform various appropriate actions and processes according to a program stored in Read Only Memory (ROM) 402 or a program loaded from storage device 406 into Random Access Memory (RAM) 403. In RAM 403, various programs and data required for the operation of the electronic device 400 are also stored.

Processing device 401, ROM 402 and RAM 403 are connected to each other through bus 404. Input/Output (I/O) interface 405 is also connected to bus 404.

Generally, the following devices can be connected to I/O interface 405: input devices 406 comprising, for example, a touch screen, a touch pad, a keyboard, a mouse, a camera, a microphone, an accelerometer, a gyroscope, etc.; output devices 407 comprising a liquid crystal display (LCD), a speaker, a vibrator, etc.; storage devices 406 comprising, for example, a magnetic tape driver, a hard disk driver, etc.; and a communication device 409. The communication device 409 enables the electronic device 400 to communicate wirelessly or wirelessly with other devices to exchange data. Although FIG. 4 shows the electronic device 400 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 409, or installed from the storage device 406, or from the ROM 402. When the computer program is executed by the processing device 401, the above functions defined in the method of the embodiment of the present disclosure are performed.

The terminal provided by this embodiment of the present disclosure and the video recording method provided by the above embodiment belong to the same inventive concept. For the technical details not described in detail in this embodiment, reference can be made to the above embodiment, and this embodiment can achieve the same beneficial effect as the above embodiment.

Embodiment 5

An embodiment of the present application provides a computer storage medium on which a computer program is stored, which when executed by a processor implements the video recording method provided in the above embodiment.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wires, optical cables, RF (Radio Frequency), etc., or any suitable combination of the above.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a Local Area Network ("LAN"), a Wide Area Network ("WAN"), an Internet (e.g., the Internet), and an end-to-end network (e.g., an ad hoc end-to-end network), as well as any currently known or future developed network.

The above computer-readable medium may be comprised in the electronic device described above; or it may exist alone without being assembled into the electronic device.

The computer-readable medium carries one or more programs that cause, when executed by the electronic device, the electronic device to perform steps of:

when receiving a recording preparation instruction, prompting a recording subject matching the recording preparation instruction to inform a user of subject information of a to-be-recorded video;

when receiving a recording start instruction, recording videos for the user and a virtual teacher separately according to a recording sequence matching the recording subject; determining response information based on a voice content of the user in a video recorded for the user, and playing a voice of the virtual teacher expressing the response information as a video background voice, when recording the video recorded for the user.

The computer program code for executing operations of the present disclosure may be complied by any combination of one or more program design languages, the program design languages comprising object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the name of a unit does not constitute a limitation of the unit itself under certain circumstances, for example, a unit for displaying editable content may also be described as "an editing unit".

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, [Example 1] provides a video recording method, comprising:

when receiving a recording preparation instruction, prompting a recording subject matching the recording preparation instruction to inform a user of subject information of a to-be-recorded video;

when receiving a recording start instruction, recording videos for the user and a virtual teacher separately according to a recording sequence matching the recording subject; determining response information based on a voice content of the user in a video recorded for the user, and playing a voice of the virtual teacher expressing the response information as a video background voice, when recording the video recorded for the user.

According to one or more embodiments of the present disclosure, [Example 2] provides a video recording method, wherein, optionally, prompting a recording subject matching the recording preparation instruction comprises:

displaying the recording subject matching the recording preparation instruction;

or playing a voice stating the recording subject matching the recording preparation instruction.

According to one or more embodiments of the present disclosure, [Example 3] provides a video recording method, wherein recording videos for the user and a virtual teacher separately according to a recording sequence matching the recording subject optionally comprises:

determining a first time recorded object and a non-first time recorded object based on the recording sequence, wherein the first time recorded object comprises the user or the virtual teacher, and the non-first time recorded object comprises the virtual teacher or the user;

recording a video of the first time recorded object;

when the video of the first time recorded object recording reaches a switching node, suspending recording the video of the first time recorded object;

recoding a video of the non-first time recorded object, during which the non-first time recorded object responds based on a behavior of the first time recorded object during a video recording process of the first time recorded object;

wherein, during a video recording process, the first time recorded object or the non-first time recorded object is displayed in a full-screen display mode.

According to one or more embodiments of the present disclosure, [Example 4] provides a video recording method, wherein, optionally, if the first time recorded object is the user, recoding a video of the first time recorded object comprises:

adding an overlay to the video started being recorded for a predetermined length of time to guide the user to enter a recording state.

According to one or more embodiments of the present disclosure, [Example 5] provides a video recording method, wherein, optionally, recording a video recorded for the user further comprises:

displaying text of the response information and/or a picture associated with the response information on a video recording page.

According to one or more embodiments of the present disclosure, [Example 6] provides a video recording method, wherein, optionally, determining response information based on a voice content of the user in a video recorded for the user comprises:

determining a degree of matching between the voice content of the user in the video and a preset content;

if the degree of matching reaches a threshold, determining that the response information is first-type information, so as to praise the user's behavior through the first-type information; otherwise determining that the response information is second-type information, so as to encourage the user's behavior through the second-type information.

According to one or more embodiments of the present disclosure, [Example 7] provides a video recording method, optionally, further comprising:

stitching the video recorded for the user and a video recorded for the virtual teacher based on a recording timing relationship;

playing a stitched video in a full screen mode;

wherein, the video recorded for the user comprises a background voice issued by the virtual teacher, the background voice comprising the virtual teacher's response information to the information expressed by the user during a video recording process.

According to one or more embodiments of the present disclosure, [Example 8] provides a video recording apparatus, comprising:

a prompting module for when receiving a recording preparation instruction, prompting a recording subject matching the recording preparation instruction to inform a user of subject information of a to-be-recorded video;

a recording module for when receiving a recording start instruction, recording videos for the user and a virtual teacher separately according to a recording sequence matching the recording subject; determining response information based on a voice content of the user in a video recorded for the user, and playing a voice of the virtual teacher expressing the response information as a video background voice, when recording the video recorded for the user.

According to one or more embodiments of the present disclosure, [Example 9] provides an electronic device, comprising:

one or more processors;

a memory for storing one or more programs, which when executed by the one or more processors cause the one or more processors to implement the following video recording method:

when receiving a recording preparation instruction, prompting a recording subject matching the recording preparation instruction to inform a user of subject information of a to-be-recorded video;

when receiving a recording start instruction, recording videos for the user and a virtual teacher separately according to a recording sequence matching the recording subject; determining response information based on a voice content of the user in a video recorded for the user, and playing a voice of the virtual teacher expressing the response information as a video background voice, when recording the video recorded for the user.

According to one or more embodiments of the present disclosure, [Example 10] provides a storage medium containing computer executable instructions that, when executed by a computer processor, execute the following video recording method:

when receiving a recording preparation instruction, prompting a recording subject matching the recording preparation instruction to inform a user of subject information of a to-be-recorded video;

when receiving a recording start instruction, recording videos for the user and a virtual teacher separately according to a recording sequence matching the recording subject; determining response information based on a voice content of the user in a video recorded for the user, and playing a voice of the virtual teacher expressing the response information as a video background voice, when recording the video recorded for the user.

According to one or more embodiments of the present disclosure, [Example 11] provides a computer program product, comprising: a computer program that, when executed by a processing device, executes the steps of the method of any embodiment of the present disclosure.

According to one or more embodiments of the present disclosure, [Example 12] provides a computer program that, when executed by a processing device, executes the steps of the method of any embodiment of the present disclosure.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept. For example, technical solutions formed by replacing the above features with technical features having similar functions to those disclosed in the present disclosure (but not limited to).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A video recording method, comprising:
   prompting a recording subject to inform a user of subject information of a to-be-recorded video, when receiving a recording preparation instruction, wherein the recording subject matches the recording preparation instruction;
   recording a video for the user and a video for a virtual teacher separately according to a recording sequence matching the recording subject, when receiving a recording start instruction; and
   determining response information based on a voice content of the user in the video recorded for the user, and playing a voice of the virtual teacher expressing the response information as a video background voice, when recording the video for the user,
   wherein prompting a recording subject comprises:
   displaying the recording subject matching the recording preparation instruction; or
   playing a voice stating the recording subject matching the recording preparation instruction.

2. The video recording method according to claim 1, wherein recording videos for the user and a virtual teacher separately according to a recording sequence matching the recording subject comprises:
   determining a first time recorded object and a non-first time recorded object based on the recording sequence, wherein the first time recorded object comprises the user or the virtual teacher, and the non-first time recorded object comprises the virtual teacher or the user;
   recording a video of the first time recorded object;
   suspending recording the video of the first time recorded object, when the video of the first time recorded object recording reaches a switching node; and
   recoding a video of the non-first time recorded object, during which the non-first time recorded object responds based on a behavior of the first time recorded object during a video recording process of the first time recorded object, wherein, during the video recording, the first time recorded object or the non-first time recorded object is displayed in a full-screen display mode.

3. The video recording method according to claim 2, wherein when the first time recorded object is the user, recoding a video of the first time recorded object comprises:
   adding an overlay to the video being recorded for a predetermined length of time to guide the user to enter a recording state.

4. The video recording method according to claim 2, wherein the switching node is identified and determined based on a recorded video content.

5. The video recording method according to claim 1, further comprising:
   displaying text of the response information and/or a picture associated with the response information on a video recording page, when recording a video recorded for the user.

6. The video recording method according to claim 1, wherein determining response information based on a voice content of the user in a video recorded for the user comprises:
   determining a degree of matching between the voice content of the user in the video and a preset content; and
   determining that the response information is first-type information to praise the user's behavior through the first-type information, if the degree of matching reaches a threshold; otherwise determining that the response information is second-type information to encourage the user's behavior through the second-type information.

7. The video recording method according to claim 1, further comprising:
   stitching the video recorded for the user and a video recorded for the virtual teacher based on a recording timing relationship; and
   playing a stitched video in a full screen mode, wherein, the video recorded for the user comprises a background voice form the virtual teacher, the background voice comprising the virtual teacher's response information to the information expressed by the user during a video recording process.

8. The video recording method according to claim 1, wherein: the recording subject comprises information contained in the video that needs to be expressed by the user; and the recording preparation instruction comprises an instruction triggered when the user enters a certain roles-card page.

9. The video recording method according to claim 1, wherein the prompting a recording subject matching a recording preparation instruction to inform a user of subject information of a to-be-recorded video comprises:
   displaying the subject information of a specific plot on a roles-card page, when the user enters, through a specific application, the roles-card page, which is an entry page for recording a video of a specific plot.

10. The video recording method according to claim 1, wherein the recording videos for the user and a virtual teacher separately according to a recording sequence matching the recording subject comprises:

displaying only one recording object on a video recording page, at each point of time in video recording, wherein the recording object comprises the user and the virtual teacher.

11. An electronic device, comprising:
one or more processors;
a memory for storing one or more programs,
which when executed by the one or more processors cause the one or more processors to implement following steps:
prompting a recording subject to inform a user of subject information of a to-be-recorded video, when receiving a recording preparation instruction, wherein the recording subject matches the recording preparation instruction;
recording videos for the user and a virtual teacher separately according to a recording sequence matching the recording subject, when receiving a recording start instruction; and
determining response information based on a voice content of the user in a video recorded for the user, and playing a voice of the virtual teacher expressing the response information as a video background voice, when recording the video recorded for the user;
wherein prompting a recording subject comprises:
displaying the recording subject matching the recording preparation instruction; or
playing a voice stating the recording subject matching the recording preparation instruction.

12. The electronic device according to claim 11, wherein the one or more processors implement following steps:
determining a first time recorded object and a non-first time recorded object based on the recording sequence, wherein the first time recorded object comprises the user or the virtual teacher, and the non-first time recorded object comprises the virtual teacher or the user;
recording a video of the first time recorded object;
suspending recording the video of the first time recorded object, when the video of the first time recorded object recording reaches a switching node; and
recoding a video of the non-first time recorded object, during which the non-first time recorded object responds based on a behavior of the first time recorded object during a video recording process of the first time recorded object, wherein, during a video recording process, the first time recorded object or the non-first time recorded object is displayed in a full-screen display mode.

13. The electronic device according to claim 12, wherein the one or more processors implement following steps:
adding an overlay to the video started being recorded for a predetermined length of time to guide the user to enter a recording state.

14. The electronic device according to claim 11, wherein the one or more processors implement following steps:
displaying text of the response information and/or a picture associated with the response information on a video recording page, when recording a video recorded for the user.

15. The electronic device according to claim 11, wherein the one or more processors implement following steps:
determining a degree of matching between the voice content of the user in the video and a preset content; and
determining that the response information is first-type information, if the degree of matching reaches a threshold, so as to praise the user's behavior through the first-type information; otherwise determining that the response information is second-type information, so as to encourage the user's behavior through the second-type information.

16. The electronic device according to claim 11, wherein the one or more processors implement following steps:
stitching the video recorded for the user and a video recorded for the virtual teacher based on a recording timing relationship; and
playing a stitched video in a full screen mode, wherein, the video recorded for the user comprises a background voice issued by the virtual teacher, the background voice comprising the virtual teacher's response information to the information expressed by the user during a video recording process.

17. A non-transitory storage medium containing computer executable instructions for executing following steps when executed by a computer processor:
prompting a recording subject to inform a user of subject information of a to-be-recorded video, when receiving a recording preparation instruction, wherein the recording subject matches the recording preparation instruction;
recording videos for the user and a virtual teacher separately according to a recording sequence matching the recording subject, when receiving a recording start instruction; and
determining response information based on a voice content of the user in a video recorded for the user, and playing a voice of the virtual teacher expressing the response information as a video background voice, when recording the video recorded for the user;
wherein prompting a recording subject comprises:
displaying the recording subject matching the recording preparation instruction; or
playing a voice stating the recording subject matching the recording preparation instruction.

* * * * *